Aug. 15, 1933.  E. KUECHLE  1,922,210
SPRING COVER
Filed May 13, 1929
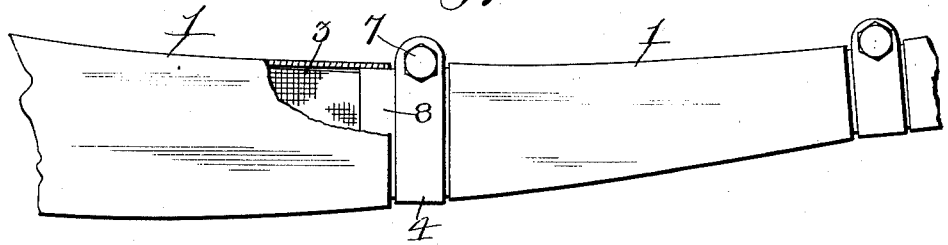
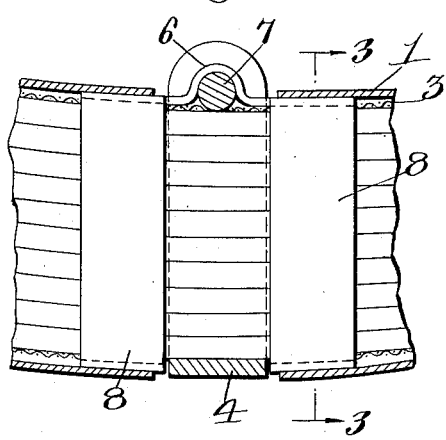
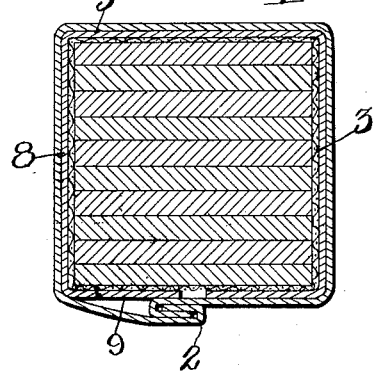
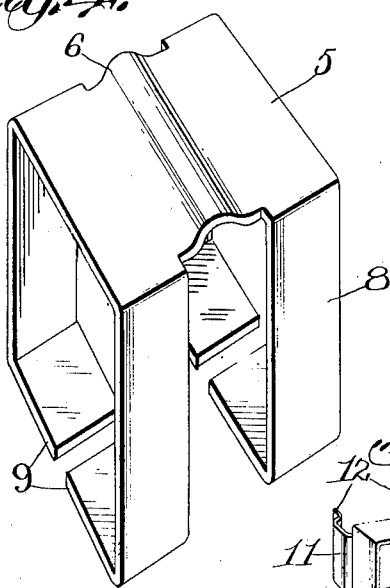
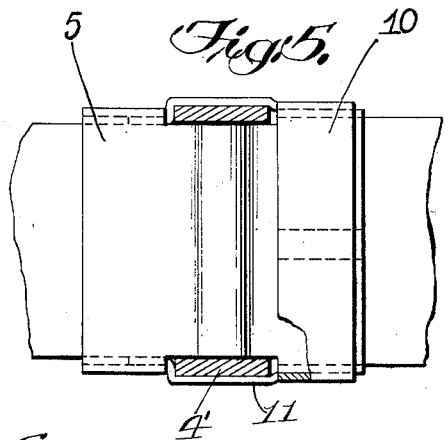
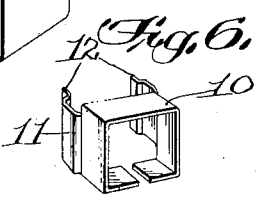
Inventor
Ernst Kuechle
By
Attorneys Patented Aug. 15, 1933

1,922,210

UNITED STATES PATENT OFFICE 1,922,210

SPRING COVER

Ernst Kuechle, Milwaukee, Wis., assignor, by mesne assignments, to I-X-L Metal Spring Cover Company, Milwaukee, Wis., a Corporation of Wisconsin Application May 13, 1929. Serial No. 362,769

2 Claims. (Cl. 267—37)

This invention relates to new and useful improvements in spring covers.

One of the objects of my invention is the provision of a novel type of spring cover formed in sections adapted to entirely enclose the laminations of a vehicle spring in order to protect the spring against the accumulation of dirt and dust and also to provide a substantially waterproof covering with an improved clip cover adapted to embrace that portion of the vehicle spring which is engaged by a metal clip for holding the laminations of the spring together, so as to entirely enclose that part of the spring between the cover sections.

A further object of the invention is the provision of a spring cover preferably formed of metal with its interconnected edges overlapped along the bottom of the spring member with the ends of the cover sections terminating upon opposite sides of the usual spring clip and also to provide means for covering and enclosing that section of the spring usually exposed through the application of the clip.

A still further object of my invention is the provision of novel improvements in a spring cover and more particularly in a cap or closure forming a part of the cover and designed to enclose the upper portion of the spring clip as well as a portion of the laminations of the spring adjacent the clip so as to entirely cover all parts of the spring member.

A further object of the invention is the provision of a spring cover comprising an outer metallic cover so constructed and arranged that it can be quickly and readily applied to a vehicle spring and the cover also includes a fabric lining for the outer casing which is adapted to surround the spring member and has a tendency to retain the lubricant within the housing and also to absorb any fine dust or other particles which might work their way into the housing and prevent them from working between the laminations of the spring.

With the above and other objects in view, the invention consists in the novel features of construction, the combination and arrangement of parts hereinafter more fully set forth, pointed out in the claims and shown in the accompanying drawing wherein:

Figure 1 is a side elevation illustrating the application of my novel device with parts thereof broken away and illustrated in section;

Figure 2 is a detailed sectional view of the housing with the clip cover in elevation;

Figure 3 is a transverse section on the line 3—3 of Figure 2;

Figure 4 is a perspective view of the clip cover;

Figure 5 is a detailed plan view illustrating another form of the invention with parts thereof broken away and illustrated in cross section; and Figure 6 is a detailed perspective view of the form shown in Figure 5.

In Figure 1, it will be noted that the spring cover is formed with a plurality of sections, each section comprising a substantially rectangular body 1 adapted to be sprung around the laminations of the spring with the edges of the body bent upon themselves to form hook-like members 2 which are interlocked beneath the spring members, as shown in Figure 3.

It will be noted that different sizes and shapes of sections are necessary in order to fit the different thicknesses of the spring member throughout its length, these sections are formed of substantially rectangular shape with the side walls on which the hooks 2 are formed bent inwardly and engaged after the bodies 1 are applied to the springs. Before placing the covers on the springs, the springs are enclosed with a fabric cover 3. This fabric covering 3 may be of canvas or any other similar material to prevent the lubricant, which may be graphite or similar lubricant, from escaping from between the laminations of the spring and will also prevent fine particles of dirt from entering between the laminations.

These cover sections which are applied to the body of the spring terminate upon opposite sides of the usual spring clip 4 and therefore leave a space between the clip and the cover sections. I proposed to enclose this space by means of an improved clip cover which comprises a top member 5, the intermediate portion of which is arcuately bowed, as shown at 6, in order to fit snugly over the clip bolt 7, as is illustrated in Figure 2.

Extending from opposite sides of the cover and upon opposite sides of the transverse center thereof are the spaced arms 8 which extend downwardly upon opposite sides of the spring member and the extremities thereof bent at right angles as shown at 9, and extended beneath the lower portion of the spring. These arms 8 are arranged upon opposite sides of the clip 4 and by bending the extremities of the arms inwardly beneath the springs, the clip cover will be securely held in place.

It will be noted that in applying the cover to the springs, the arms 8 fit closely the side portions of the clips 4 and entirely cover the bolt 7 between the arms of the clip, while the arms 8 of the clip cover extend almost entirely around the spring. It will be apparent that the clip covers are first placed in position and then the spring covers are fitted thereover, the ends of the spring covers extend over the arms 8 and the top 5, as shown in Figure 2. This entirely encloses the spring members as will be readily apparent.

It will be apparent from the foregoing that I have provided a simple and inexpensive device of the above character wherein the clip bolt as well as that portion of the spring between the ends of the covers are enclosed by an improved clip cover so as to render the casing for the springs substantially water-proof, as well as prevent dirt and small particles from working in between the laminations of the spring and at the same time retain the lubricant in contact with the laminations of the spring.

In Figures 5 and 6, I have illustrated a slightly modified form of the invention wherein I provide an additional sleeve member 10, the ends of which are disposed beneath the bottom portion of the spring members and is provided with laterally disposed spaced arms with offset portions 11 adapted to embrace the sides of the clip 4'. The ends of the arms which extend laterally from the sleeve 10 are arranged in spaced parallel relation, as shown at 12, and engaged beneath the arms 8 at one side of the clip cover, so as to retain the offset parts 11 in close engagement with the sides of the clip 4'.

It will be apparent that in the modified form of the invention, the sides of the spring clips are enclosed and this further provides for protection to the spring member to assist in preventing dirt and other items from working in beneath the spring covers.

Attention is further directed to the fact that while the ends 9 of the clip cover are illustrated as slightly spaced apart, the same may be readily overlapped in instances where desired, thus avoiding the necessity of providing a close fit and also entirely enclosing the bottom portion of the spring adjacent the clip.

I claim:

1. In combination with a vehicle spring, a clip embracing the spring, and a clip cover comprising a top plate having an up-struck transversely extending centrally disposed clip bolt receiving bead, depending spaced arms formed on the sides of the top plate for contacting with the opposite sides of the vehicle spring and the opposite edges of the sides of the clip, inturned extensions formed on the lower ends of the arms contacting with the bottom of the vehicle spring and the opposite sides of the bottom of the clip, and a sleeve for receiving a portion of said cover having laterally projecting resilient arms engaging over the opposite sides of the clip between the arms of the cover.

2. In combination with a vehicle spring, a clip embracing the spring, and a clip cover comprising a top plate having an up-struck transversely extending centrally disposed raised clip bolt receiving bead, depending spaced arms formed on the sides of the top plate for contacting with the opposite sides of the vehicle spring and the opposite edges of the sides of the clip, in-turned extensions formed on the lower ends of the arms contacting with the bottom of the spring and the opposite sides of the bottom of the clip, a sleeve for receiving a portion of said cover having laterally projecting resilient arms engaging over the sides of the clip between the arms of the cover, and extensions on the resilient arms engaging under certain arms of the cover.

ERNST KUECHLE.